3,137,222
PHOTOGRAPHIC SHUTTER
Franz Singer and Karl Härtl, Munich, Germany, assignors to Compur-Werk G.m.b.H. & Co., Munich, Germany, a firm of Germany
Filed Mar. 9, 1962, Ser. No. 178,653
Claims priority, application Germany Mar. 10, 1961
1 Claim. (Cl. 95—63)

This invention relates to a photographic shutter, and especially but not exclusively to a shutter of the general type in which a diaphragm is completely closed between successive exposures and opens up to a preselected aperture concomitantly with the opening of the shutter blades during the making of the exposure.

An object of the invention is the provision of a generally improved and more satisfactory photographic shutter.

Another object is the provision of an improved shutter in which the shutter blades move in a single direction from a first closed position through an open position a second closed position during the making of an exposure and move back in an opposite direction through open position to the first closed position during the cocking or tensioning of the shutter ready for the next exposure, and in which an adjustable diaphragm is closed down to a completely closed position at the conclusion of an exposure, so that the diaphragm acts as a "cover blind" to prevent light from reaching the film when the shutter blades are temporarily opened during the cocking or tensioning operation.

Still another object is the provision of a shutter having improved means for controlling and timing the various operations of the various parts of the shutter mechanism.

A further object is the provision of improved means for synchronizing the closing of a flash illumination circuit with the making of the exposure, and improved means for delaying the beginning of the exposure after the release or triggering of the shutter, so that the photographer has time to place himself in the field of view of the camera.

These and other desirable objects may be attained in the manner disclosed as an illustrative embodiment of the invention in the following description and in the accompanying drawings forming a part hereof, in which.

Figure 1:
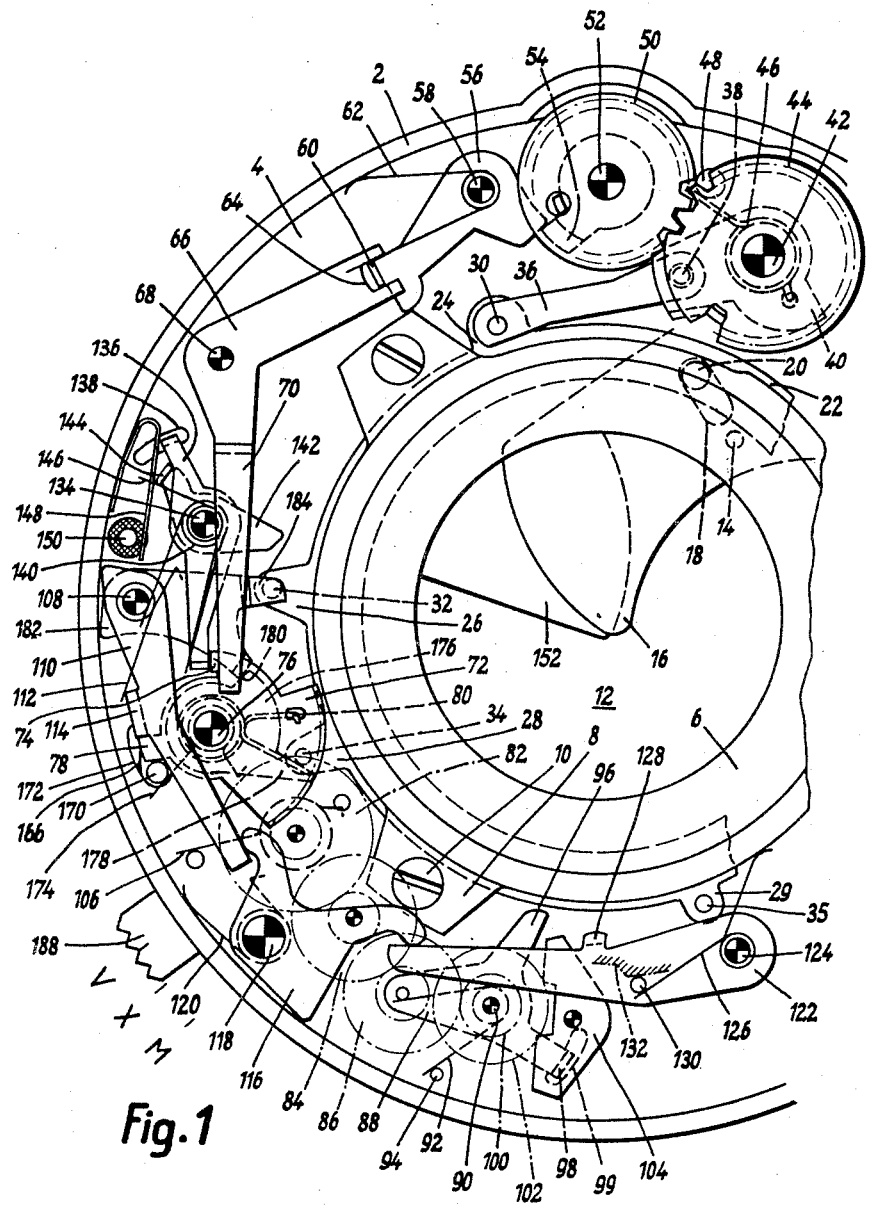
FIG. 1 is a front elevation of a shutter according to a preferred embodiment of the invention, with the cover plate and other overlying parts removed in order to show the parts beneath, with some parts broken away and some shown only schematically.

In its preferred form, the shutter comprises the usual annular housing or casing customarily found in objective shutters (also sometimes called between-the-lens shutters), the outer cylindrical wall of the housing being partially shown at 2, and the central exposure aperture through which light is admitted into the camera being shown at 12. Held in the housing by any conventional means is an annular base plate or mechanism plate 4. A lens tube 6 of generally cylindrical shape has outwardly extending radial lugs 8 which are secured to the base plate by screws 10. The internal diameter of the lens tube 6 determines the maximum possible size of the exposure aperture 12. The optical axis extends through the center of the opening 12, in a direction perpendicular to the plane of the paper in FIGS. 1 and 2.

Pivotally mounted on pivot pins 14 at the back of the base plate 4 are the shutter blades 16. For the sake of simplicity and clarity, only one blade is shown, but those skilled in the art will readily understand that several blades are used, five being a convenient number. Each blade has an operating slot 18, extending radially with respect to the pivot pin 14. Each slot is engaged by a driving pin 20 on a blade ring 22 which is mounted in conventional manner to rotate (through only a part of a single revolution) concentrically with the lens tube 6 and the optical axis. The blade ring is mounted behind the base plate 4, and is held against axial movement in any convenient manner. The blades are preferably of the double-ended or double-lobe type, the portion (partly broken away) to the right of a line passing through the center of the pivot 14 and the center of the slot 18 (when viewed as in FIG. 1) being a reverse duplicate or mirror image of the illustrated portion to the left of such line. The left hand ends or lobes of all of the blades 16, collectively overlapping each other, completely close the aperture 12 and prevent passage of light therethrough when the blade ring is in the position shown in FIG. 1, which is the tensioned or cocked position of the parts, ready for making an exposure. During the exposure cycle, as further described below, the blade ring 22 turns clockwise from the position of FIG. 1, swinging the blades 16 in a clockwise direction on their pivots 14, from the first closed position as illustrated, through a fully open position, to a second closed position wherein the second ends or lobes of the several blades overlap each other and again close the aperture 12. During the subsequent tensioning or cocking movement, to make the shutter ready for the next exposure, the blades swing back from their second closed position through open position to their first closed position, but at this time no light is admitted through the aperture because the aperture is completely closed by the diaphragm, as further explained below. The blade ring has several lugs 24, 26, 28, and 29 which extend radially outwardly at various points spaced circumferentially around the ring. These lugs carry pins 30, 32, 34, and 35, respectively.

One end of a link 36 is pivotally mounted on the pin 30. The other end is pivoted at 38 to a driving element or master member 40 rotatably mounted on a fixed pivot 42 and fastened to a gear 44 on the same pivot, to rotate therewith. A main driving spring or master spring 46 is coiled around the pivot 42 between the members 40 and 44. One end of the spring is fastened to one of these members. The other end bears against an abutment in the form of a fixed pin 48, in a direction to tend to turn the master member 40 (and its coupled gear wheel 44) in a counterclockwise direction when viewed from the front as in FIG. 1.

Figure 3:
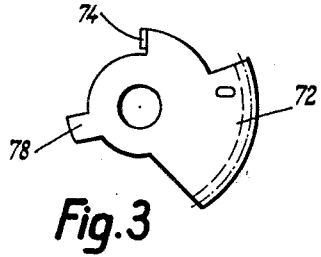
FIG. 3 is a detail of a gear segment constituting part of the preferred construction.

The gear 44 meshes with another gear 50 fixed to a cocking or tensioning shaft 52 which extends axially in the shutter housing (that is, parallel to the optical axis) and which is operated in any conventional manner by known mechanism in or on the camera body to which the shutter is attached, to turn the shaft in a counterclockwise direction (preferably but not necessarily by the act of feeding or advancing the film) in order to cock or tension the shutter ready for the next exposure. A locking tooth 54 is mounted on the shaft 52 and is fastened to the gear 50 so that it cannot rotate relative to the gear. The parts are retained in tensioned position by engagement of the tooth 54 with the latching nose of a pawl 56 pivoted on a fixed pivot 58. The pawl has another arm with an upstanding lug or angled portion 60, against which bears one arm of a hairpin spring 62 coiled around the pivot 58, the other arm of the spring reacting against the side wall of the housing, so that the spring tends to hold the latching pawl resiliently in latching position. This same lug 60 also engages a slot in the forked end 64 of one arm of a somewhat bellcrank shaped lever 66 rotatable on a fixed pivot 68. The other arm 70 of the lever extends into the path of motion of an upstanding ear 74 constituting an entraining abutment on a gear segment 72 (see FIG. 3 as well as FIG. 1) rotatably mounted on a fixed pivot 76. The segment 72 has gear teeth on part of its periphery, as shown schematically, and a radial arm 78 on another part of its periphery. A spring 80 coiled around the pivot 76 has one end fixed to the segment 72 (e.g., by having this end extending into a bore in the segment) and its other end projects into the path of the pin 34 on the blade ring 22. When the blade ring is in the tensioned position shown in FIG. 1, the pin 34 presses against the second end of the spring 80 as shown, placing this spring under tension in a direction to tend to turn the gear segment 72 in a clockwise direction on its pivot 76. However, when the blade ring moves clockwise from the position of FIG. 1, in a running down direction toward its rest position, the clockwise movement of the pin 34 relieves the pressure on the second arm of the spring 80, so that the spring relaxes and no longer tends to turn the gear segment.

Figure 5:
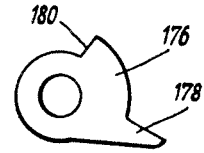
FIG. 5 is a detail of lever constituting part of the preferred construction.

This gear segment 72 constitutes the first member or input member of a delaying mechanism or retarding gear train. The gear train comprises a first step gear (gears of two diameters, i.e., pinion and gear wheel, either formed integrally with each other or joined to each other to turn together) 82 rotatable on a fixed pivot, with the pinion of this step gear meshing with the teeth of the gear segment 72 and with the gear wheel of this step gear meshing with the pinion of a second step gear 84, the gear wheel of which is adapted to mesh with the pinion of a third step gear 86. This third step gear, however, is not mounted on a fixed pivot, but on the contrary its pivot is carried by a leftwardly extending arm 88 of a three-armed lever (see FIG. 5 as well as FIG. 1) which is pivoted on a fixed pivot 90. The swinging of the lever arm 88 carries the pinion of the third step gear 86 into or out of engagement with the gear wheel of the second step gear 84. A hairpin spring 92, bearing against the pivot of the gear 86 and against a fixed pin 94, urges the three-armed lever in a clockwise direction, tending to keep the gears 84 and 86 in meshing engagement.

The second arm 96 of the three-armed lever is in the path of movement of the pin 35 on the blade ring 22, in such fashion that during the running-down movement of the blade ring, just before reaching its rest position, the pin 35 will engage this second arm 96 and rotate the three-armed lever counterclockwise, against the force of the spring 92, to disengage the gear 86 from the gear 84. The third arm 98 of the three-armed lever has an angularly bent ear or lug which projects rearwardly through a slot 99 in the base plate 4 and cooperates with a portion 196 on a selector ring 186 located behind the base plate 4, as further described hereafter.

The larger gear wheel of the step gear 86 meshes constantly (in all positions of the three-armed lever 88, 96, 98) with a pinion 100 rotatably mounted on the pivot 90 of the lever and fixed to a star wheel or escapement wheel 102 rotatable with the pinion on the same pivot. The escapement wheel engages in conventional manner with the conventional vibrating anchor or escapement pallet 104 rockable on a fixed pivot. A light torsion spring 106, bearing at one end on a fixed abutment and at the other end on the first step gear 82, tends to turn this step gear in a clockwise direction and the gear segment 72 in a counterclockwise direction.

Rotatably mounted on a fixed pin 108 is a latching pawl 110 urged by a hairpin spring 112 to swing in a counterclockwise direction to a latching position in which an angled abutment or ear 114 on the pawl lies in the path of the tooth 78 on the gear segment 72 and thus acts as a releasable detent preventing the gear segment from turning clockwise under the influence of the spring 80. This detent ear 114 is at an intermediate point in the length of the pawl 110. The far end or free end of the pawl (remote from the pivot 108) bears against the left hand arm of a two-armed lever 116 which is fixed to an axially extending release shaft 118 which can be turned in any convenient manner known in the art, from the release plunger or other release mechanism of the camera body with which this shutter is used. A hairpin spring 120 urges the lever 116 and its shaft 118 in a clockwise direction, to a limit position wherein one corner of the lever bears against the cylindrical wall of the housing 2.

The right hand arm of the two-armed lever 116 cooperates with a locking lever or "bulb" lever 122 which is pivoted on a fixed pin 124 and is urged in a clockwise direction by a hairpin spring 126, one end of which bears against the lens tube 6 and the other end of which bears against a pin 130 on the lever 122. The lever has a downturned ear 128 so placed that when the lever is swung somewhat clockwise from its position shown in FIG. 1, this ear 128 will lie in the path of travel of the pin 35 on the blade ring 22, in such location as to be engaged by this pin and stop the clockwise motion of the blade ring just as the shutter blades reach their fully open positions and before they start to close. Apart from its cooperation with and control by the lever 116, the locking lever or bulb exposure lever 122 is also controlled by the cooperation of its above-mentioned pin 130 with the cam edge 132 on the usual speed control ring of the shutter, which ring rotates in the usual conventional manner about the optical axis. When the speed control ring is set or adjusted for any one of the "instantaneous" exposures (exposures whose duration is determined by the internal mechanism of the shutter, rather than by external manual action) the edge of the cam 132 will prevent the bulb lever 122 from swinging clockwise from the position shown in FIG. 1, so that even when the lever 116 swings counterclockwise (upon releasing or triggering the shutter to make an exposure) the ear 128 cannot move into the path of travel of the pin 35. But when the speed control ring is set for a "bulb" exposure (duration controlled manually) the part of the cam edge 132 which is then opposite the pin 130 is closer to the optical axis, so that when the release lever 116 swings counterclockwise, the bulb lever can swing clockwise under the influence of its spring 126, thereby putting the ear 128 in a position to intercept the pin 35 to stop the motion of the blade ring when the blades are fully open. Then when manual pressure on the shutter release plunger is removed, the release lever 116 swings back in a clockwise direction to its initial position, causing counterclockwise motion of the bulb lever 122 to its initial position, thereby removing the ear 128 from the path of the pin 35 and allowing the blade ring 22 to resume its clockwise movement to close the shutter blades, to complete the manually timed or "bulb" exposure.

In its preferred form, the shutter of the present invention includes simple and satisfactory means for synchronizing the exposure with the operation of flash illumination apparatus both of the instantaneous flash type and of the time-lag flash type (respectively known in recent years as "X" type and "M" type) so as to provide what is often called "full synchronization" of the shutter. Moreover, the present shutter preferably also provides a pre-timer for delayed exposure (frequently known in recent years as "V" operation), so that the shutter, in this preferred form, constitutes what is known in the art as an "MXV" shutter. The pre-timer or "V" mechanism comprises the retarding gear train parts 82 to 104 already described above. The M and X synchronizer mechanism will now be described.

On a fixed pivot pin 134 there are rotatably mounted two synchronizer levers, the M control lever 136 and the X control lever 142. The M lever 136 has one end bent rearwardly to form an ear projecting through a slot 138 in the base plate 4, to cooperate with and be controlled by the MXV selector ring 186 as further described hereafter. The other end of the M lever 136 is bent forwardly and is engaged by one end of a hairpin spring 140 tending to swing the lever 136 in a counterclockwise direction to keep this other end of the lever in engagement with the entraining abutment ear 74 on the gear segment 72. The X control lever 142 has one end lying in the path of travel of the pin 32 on the blade ring 22, to be engaged and moved counterclockwise thereby just as the shutter blades reach fully open position. The other end of the control lever 142 has a forwardly bent ear 144 engaged by a hairpin spring 146 which tends to turn the lever 142 in a clockwise direction. However, the ear 144 is retained by engagement with one arm of a U-shaped electric contact spring 148, the second and shorter arm of which is secured to the metallic housing wall 2 in electrical contact therewith. The electric contact pin 150 is mounted in the shutter housing but electrically insulated therefrom. This pin lies close to the longer arm of the contact spring 148 in position to be engaged by and make electrical contact with the spring 148 when the long arm of the spring is deflected radially outwardly (away from the optical axis) as can be done by counterclockwise swinging of either the M control lever 136 or the X control lever 142.

Figure 2:
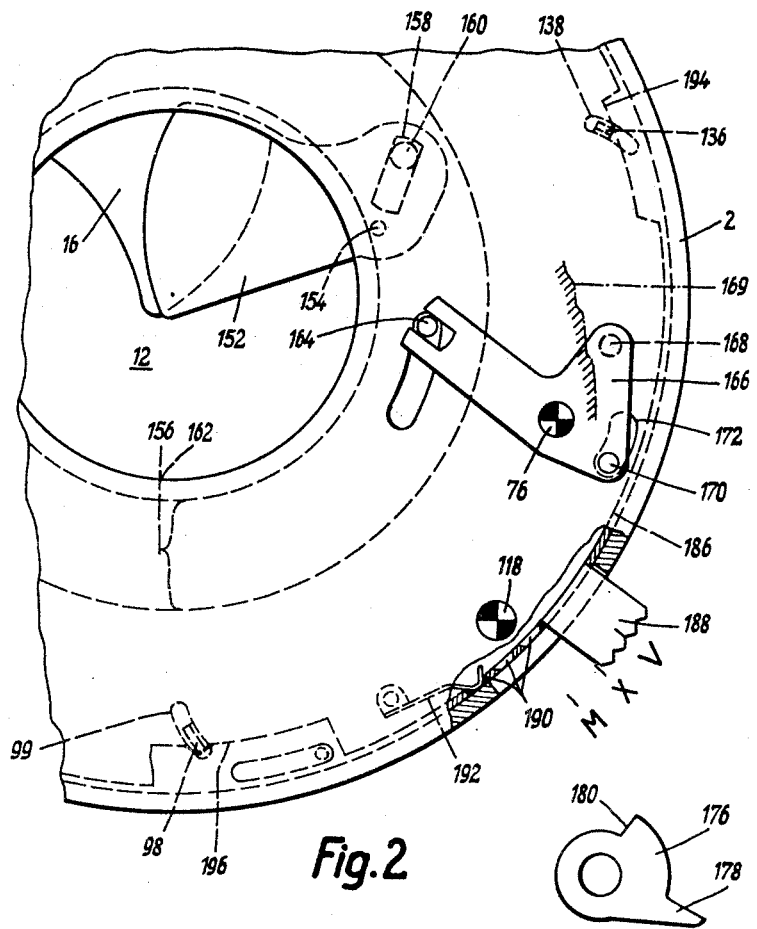
FIG. 2 is a fragmentary rear elevation of the same, likewise with certain parts omitted for the sake of clarity and other parts shown schematically.

The exposure aperture 12 can be completely closed, or opened to any desired extent, by the diaphragm leaves 152. As customary, several such leaves are used, but only one is shown in the drawings for the sake of clarity and simplicity. Referring now to FIG. 2, each leaf is fulcrumed on a pivot pin 154 fitted into a bearing ring 156 fixed in the shutter housing. Each leaf also has a driver slot 158 engaged by a driver pin 160 mounted on a diaphragm actuating ring 162 which is mounted in the housing for rotation about the optical axis as a center, but which otherwise resembles the gearing ring 156, so that when viewed in an axial direction as in FIG. 2, one of the rings completely covers the other and the same lines of the drawing indicate the corresponding peripheral edges of both rings. Rotation of the actuating ring 162 swings the respective diaphragm leaves 152 on their respective pivots 154 to any desired position from complete closure to any desired diaphragm aperture up to the maximum determined by the size of the opening 12 in the lens tube 6.

For rotating the ring 162, this ring is provided with a pin 164 embraced by the forked end of an actuating lever 166 pivoted on the back of the base plate 4 on a rearward extension of the same pivot pin 76 on which the gear segment 72 is mounted. The actuating lever 166 has a control pin 168 arranged to cooperate with an aperture selector cam edge 169 formed as part of an aperture control ring mounted in the housing for rotation about the optical axis as a center and coupled in conventional known manner with the usual external diaphragm setting ring mounted for rotation externally on the periphery of the housing, the details of such ring being unimportant for purposes of the present invention so long as the ring is so constructed that it serves to turn the selector cam or control cam 169.

Figure 4:
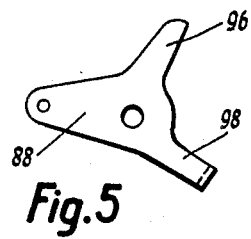
FIG. 4 is a detail of an abutment member.

The actuating lever 166 also has another control pin or entraining pin 170 which projects forwardly through a slot 172 in the rear wall of the housing 2 and in the base plate 4, and cooperates with the tooth 78 of the gear segment 72, as seen in FIG. 1. One end of a driving spring 174 bears against the pin 170 and tends to move it in a clockwise direction when viewed from the front as in FIG. 1, or counterclockwise when viewed from the rear as in FIG. 2, thus tending to open the diaphragm leaves 152. The other end of the spring 174 reacts in a counterclockwise direction (viewed as in FIG. 1) against an arm 178 of an abutment member 176 (see FIG. 4 as well as FIG. 1) which is freely rotatable on the pin 76 behind or beneath the gear segment 72. However, counterclockwise movement of the abutment member 176, by the force of the spring 174, is prevented at times by the fact that a radial shoulder 180 on the abutment member engages a latching pawl 182 pivoted on the same pivot 108 on which the pawl 110 is mounted. The same spring 112 which urges the pawl 110 in a counterclockwise direction on its pivot 108, serves also to urge the pawl 182 in a clockwise direction on the same pivot, thus tending to keep it in latching engagement with the shoulder 180 on the member 176. But the pawl 182 also has an arm 184 which lies in the path of the pin 34 on the blade ring 22. Near the end of the running down movement of the blade ring, just as the shutter blades are closing at the completion of an exposure, the pin 34 strikes the arm 184 and unlatches or releases the pawl 182 from the shoulder 180 so that the abutment member 176 can then turn in a counterclockwise direction.

For selectively conditioning the shutter for V operation, M operation, or X operation, a selector ring 186 (FIG. 2) is mounted in the housing for rotation concentrically with the optical axis. A manually operable finger piece 188 projects outwardly through a circumferential slot in the housing, as seen in FIG. 2. By circumferential pressure applied to the finger piece, the selector ring may be turned to bring an index mark on the finger piece opposite any selected one of the three designations M, X, and V which are marked on the periphery of the shutter housing and which are shown schematically in FIGS. 1 and 2. The ring has three spaced notches 190 (FIG. 2) a different one of which is resiliently engaged by the spring detent 192 in each of the three different adjusted positions of the selector ring, to tend to hold the ring resiliently in the position to which it is set until sufficient circumferential force is exerted to move it to a different position.

At one point the selector ring 186 has a circumferentially elongated projection 194 which lies opposite the rearward lug or ear on the M control lever 136 to prevent this lever from turning counterclockwise from the position shown in FIG. 1, whenever the selector ring is in either V position or X position. However, whenever the ring is shifted to M position, the projection 194 passes beyond the lug and no longer prevents the control lever 136 from turning in the counterclockwise direction. At a second point, spaced circumferentially from the projection 194, the selector ring has a second projection 196 (FIG. 2) also circumferentially elongated and having a cam shaped inner edge for cooperation with the rearwardly extending lug of the arm 98 of the three-armed lever. The cam edge is so shaped that when the selector ring is in the V position shown in FIGS. 1 and 2, the cooperating end of the arm 98 may move radially outwardly and hence the three-armed lever may swing (under the power of its spring 92) to the position illustrated in FIG. 1, where the pinion of the step gear 86 is in mesh with the step gear 84. When the selector ring 186 is shifted to either X position or M position, however, the cam edge 196 forces the arm 98 radially inwardly toward the optical axis (against the force of the spring 92) and holds it in a position in which the step gear 86 is completely unmeshed from the step gear 84.

The operation of the shutter will be largely apparent to those skilled in the art, from the foregoing description of the construction, but it may be reviewed and amplified as follows. Let it be assumed that the shutter is in the cocked or tensioned position illustrated in FIG. 1, and that the selector ring is in the V or pre-timer position illustrated. The master spring 46 is held in tensioned condition by the action of the latching pawl 56. The driving spring 80 is also tensioned by the pin 34 on the blade ring 22, and the force of this spring tends to turn the gear segment 72 in a clockwise direction, but such turning is prevented by the action of the latch 110, 114 holding the arm 78 of the gear segment. Also the driving spring 174 is in tensioned condition and is retained in such condition because of engagement of one of its ends with the arm 178 of the abutment member 176, which arm is retained against counterclockwise rotation by the same pin 34 which holds the spring 80, and because of engagement of the other end of the spring 174 with the entraining pin 170, which pin is prevented from moving in a clockwise direction by engagement with the arm 78 of the gear segment 72. The latching pawl 182 is engaged with the shoulder 180 of the abutment member 176, which prevents counterclockwise movement of the abutment member, also prevented at this time by the pin 34 as above stated. The shutter blade ring 22 and the diaphragm actuating ring 62 are both at their counterclockwise limits of motion, when viewed from the front as in FIG. 1 (or clockwise limit positions when viewed from the rear as in FIG. 2), the shutter blades 16 are in their first closed positions, and the diaphragm leaves 152 are in their fully closed positions.

Now the exposure cycle is initiated by turning the release shaft 118 slightly in a counterclockwise direction. The lever 116 fixed to the release shaft therefore causes clockwise swinging of the release pawl 110 on its pivot 108, removing the lug 114 from the arm 78 of the gear segment 72, so that the gear segment can start to turn clockwise under the power of the driving spring 80. This rotation of the gear segment proceeds at the rate or speed permitted by the action of the retarding gear trains 82–104. When the selector ring 186 is in the V position, the escapement at the end of the gear train is effectively coupled to all preceding members of the gear train, so that the running down action is relatively slow and there is a substantial time interval of about 8 or 10 seconds between the operation of the release shaft 118 and the opening of the shutter blades, to allow time for the operator to place himself in front of the camera in the field of view. When the selector ring 186 is in the M position or the X position, the escapement and the stepped gear 86 are ineffective or uncoupled from the preceding members of the gear train, so that the running down action of the gear segment proceeds much quicker.

Except for the time element, the running down action of the gear segment is the same in either case. The power of the driving spring 80 is much greater than the power of the light restoring spring 106 and easily overcomes the slight resistance of the latter. As the gear segment turns, the force of the driving spring 174 causes the pin 170 to follow along with the arm 78 of the gear segment, to turn the diaphragm actuating lever 166 to rotate the diaphragm ring 162 to open the diaphragm leaves 152 as far as permitted by the adjusted position of the preselector cam 169. When the pin 168 on the actuating lever 166 comes against the edge of the cam 169, the lever 166 can turn no further and the diaphragm leaves can not open to any wider aperture than the one previously selected, even though the arm 78 may swing further around and pull away from the pin 170.

In the course of the rotation of the gear segment 72, the entraining abutment or ear 74 thereon presses rightwardly on the crank arm 70 of the lever 66, swinging this lever counterclockwise on its pivot 68 and thus causing clockwise swinging of the master member latch 56 on its pivot 58, in a releasing direction. However, these parts are so proportioned that there is a substantial amount of lost motion, and the actual release of the latch 56 from the tooth or arm 54 does not occur until just before the gear segment 72 reaches the run down limit of its motion, which limit is determined by engagement of a corner of the gear segment with the cylindrical outer wall of the housing 2. When the parts 70, 66, 56 have moved far enough to release the master member latch, the master spring 46 drives the master member 40 in a counterclockwise direction through approximately half a revolution, pulling rightwardly on the link 36 to turn the blade ring 22 through its full range of travel in a clockwise direction, thus swinging the shutter blades 16 on their pivots 14 from their first closed positions through their fully open positions to their second closed positions, completing the actual exposure. During this turning of the blade ring 22 to make the exposure, the motion thereof may be slowed down to any desired extent by the usual conventional adjustable gear retarding means (separate from the pre-timer retarding means 82–104) as customarily found in modern objective shutters, the details thereof being unimportant for purposes of the present invention.

As the blade ring turns during the actual exposure, the free end of the driving spring 80 follows the pin 34, so that the residual energy in the spring 80 is dissipated and the spring becomes completely relaxed. The arm 178 of the abutment member 176 would also follow the motion of the pin 34 (as does the free arm of the driving spring 80) were it not for the fact that the abutment member is held against such motion by the latch 182. This latch thus serves to keep the tension in the spring 174 during the entire exposure, thereby keeping spring pressure on the pin 170 to maintain the pin 168 tight against the edge of the aperture control cam 169, to make sure that the diaphragm aperture remains at the desired value throughout the exposure. Just at the end of the exposure, as the blade ring is completing its motion, the pin 34 on the blade ring strikes the arm 184 of the latch 182, releasing the latch, and the pin 35 on the blade ring strikes the arm 96 of the three-armed lever, turning this lever to disengage the pinion of the stepped gear 86 from the gear wheel of the stepped gear 84. The release of the latch 182 enables the abutment member 176 to turn counterclockwise on the pivot 76, thereby dissipating the remaining force of the spring 174 and relaxing this spring.

The relaxing of the force of the spring 174 and the uncoupling of the escapement mechanism together serve to remove the remaining major impediments to the return motion of the gear segment 72, since the relaxing of the force of the drive spring 80 has already occurred prior to this time. Therefore, the light restoring spring 106 (which was energized during the running down of the gear train) can now restore the segment 72 and the step gears 82 and 84 to their initial starting positions, even though the force of this restoring spring is not very great. During the return motion of the gear quadrant, the arm 78 thereon strikes the entraining pin 170 of the diaphragm mechanism and turns the level 166, completely closing the diaphragm. When the gear segment 72 reaches its initial starting position, it is latched in such position by the ear 114 on the latch 110, assuming that the finger pressure on the camera release has meanwhile been removed so that the lever 116 does not interfere with the return motion of the latch 110, 114 to latching position under the power of the spring 112. This completes the exposure cycle.

During the exposure cycle, the flash contact switch has also been closed. As the blade ring 22 reaches its intermediate position corresponding to full opening of the shutter blades, the pin 32 thereon engages the inner end of the X contact lever 142 and displaces this lever in a counterclockwise direction on its pivot 134, so that the outer bent end 144 of this lever deflects the contact spring 148 to make contact with the contact pin 150, completing the electric circuit at this point. The rest of the electric circuit to the flash lamp and to the source of electric power is conventional, and therefore has not been shown, since those skilled in the art will fully understand the relation of the contact parts 148, 150 to the flash apparatus. This actuation of the switch closing lever 142 by the action of the pin 32 occurs during every exposure cycle, regardless of the position in which the selector ring 186 may have been set, and so a flash picture with flash apparatus of the instantaneous or X type may be taken even when the selector ring is adjusted to the V position for use of the pre-timer or delayed beginning mechanism.

If the selector ring 186 has been moved to the M position, the same actuation of the switch lever 142 will occur, but in addition the other or M switch lever 136 will be allowed to close the switch 148, 150 a little earlier, so that the subsequent actuation of the switch lever 142 will be meaningless. In the M position of the ring 186, as above explained, the portion 194 does not interfere with the outward swinging of the end 136 of the M switch lever. Therefore, under the power of the spring 146 one end of the lever 136 can follow the motion of the abutment 74 on the gear segment 72, and the other end of the lever will engage the contact spring 148 and deflect it into contact with the pin 150 somewhat before the gear segment 72 swings far enough around to release the latch 56 to start the actual exposure. The sizes of the various parts and their speeds of operation under the influence of their various springs are so chosen that the switch 148, 150 is closed about 16 milliseconds before the shutter blades reach their fully open position. This corresponds to the well-known time lag of the typical flash bulb of the M type, between the instant of closing the electric circuit and the instant of maximum light emission, so this arrangement is suitable for use with such flash apparatus.

At any desired time after the completion of the exposure cycle as aforesaid, the shutter may be cocked or tensioned ready for the next exposure. This is done by counterclockwise rotation of the tensioning shaft 52, to a point where the tooth 54 is again caught behind and held by the master latch pawl 56. This produces clockwise rotation of the master member 40, winding up or tensioning the master spring 46, and moving the blade ring 22 counterclockwise back to its initial or starting position. During this return movement of the blade ring, the shutter blades 16 are moved from their second closed positions backwardly through their open positions to their first closed positions, but no light is admitted to the film because the diaphragm leaves 52 are fully closed at this time and act as a "cover blind" to protect the film during the temporary opening of the shutter blades while tensioning the shutter.

During the reverse movement of the blade ring, the pin 34 releases the arm 184 of the latch 182, enabling the latch to re-engage the shoulder 180 on the abutment member 176 as soon as the abutment member is swung around to its initial starting position. Also the pin 34 engages the free end of the driving spring 80 as well as the arm 178 of the abutment member 176, swinging the latter to the intended initial position where it is latched by the latch 182, and tensioning both of the driving springs 80 and 174. The reverse movement of the blade ring also causes the pin 35 to release the arm 96 of the three-armed lever, so that the spring 92 is free to swing this lever to bring the step gear 86 into mesh with the step gear 84 if the selector ring 186 is set for V or pre-timer operation, although such re-engagement of the step gears is prevented by the portion 196 of the selector ring if the selector ring is set for M or X operation. At the completion of the cocking or tensioning cycle, the various parts are all held in their respective tensioned positions or initial starting positions by the various latches above described, the gear train latch 110, 114 having previously re-engaged with the gear segment 72 when the gear segment was returned to its initial position by the spring 106 toward the end of the exposure cycle, even before the start of the cocking or tensioning operation.

For a manually timed or "bulb" exposure, the operation is the same, except that the speed control cam 132 is so placed that the bulb control arm or lever 122 is permitted to swing inwardly toward the optical axis to a position in which the ear 128 intercepts the pin 35 approximately at the mid point of the running down movement of the blade ring, when the shutter blades are fully open. This position of the bulb lever 122 is maintained as long as the release shaft 118 and lever 116 remain in their counterclockwise release position. When the releasing pressure on the shaft 118 is removed, the right hand end of the lever 116 swings the lever 122 outwardly, disengaging the pin 35 and allowing the blade ring to continue its running down movement to close the shutter blades.

It is noted that the gear segment 72 performs a dual function, serving both as a shutter releasing element (releasing the master member latch 26) and as a diaphragm control element (controlling the operation of the diaphragm by engagement with the pin 170).

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

A photographic shutter comprising a shutter blade operating member, a master spring tending to move said member in an exposure-making direction, a diaphragm aperture adjusting member, an aperture driving spring tending to move said aperture adjusting member in one direction, a control member constituting an input member of a gear train comprising escapement mechanism and a preceding member, a control driving spring tending to move said control member in a first direction, a first latch for holding said blade operating member against the force of said master spring, means operated by movement of said control member in said first direction for releasing said first latch so that said master spring may move said blade operating member, means operated by movement of said blade operating member for relaxing said control driving spring, a light restoring spring tensioned by movement of said control member in said first direction for returning said control member in a second direction after said control driving spring has been relaxed and means operated by movement of said blade operating member for operatively disconnecting said escapement mechanism from said preceding member so that said light restoring spring may more easily return said control member in said second direction.

References Cited in the file of this patent
UNITED STATES PATENTS

| | | |
|---|---|---|
| 2,472,580 | Fuerst | June 7, 1949 |
| 2,480,973 | Schwarz | Sept. 6, 1949 |
| 2,943,551 | Gebele | July 5, 1960 |